US010579231B1

(12) United States Patent
Valleru et al.

(10) Patent No.: US 10,579,231 B1
(45) Date of Patent: Mar. 3, 2020

(54) CONTEXTUAL DRILLING INTERFACE AND RECOMMENDATION SYSTEM AND METHODS

(71) Applicant: NABORS DRILLING TECHNOLOGIES USA, INC., Houston, TX (US)

(72) Inventors: Srikanth Valleru, Spring, TX (US); Namitha Vinay, Cypress, TX (US); Jayaprasad Jayabal, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 9 days.

(21) Appl. No.: 16/177,651

(22) Filed: Nov. 1, 2018

(51) Int. Cl.
  *G06F 3/0484* (2013.01)
  *E21B 44/00* (2006.01)
  *G06F 3/0482* (2013.01)

(52) U.S. Cl.
  CPC ............ *G06F 3/0484* (2013.01); *E21B 44/00* (2013.01); *G06F 3/0482* (2013.01)

(58) Field of Classification Search
  CPC ....... G06F 3/0484; G06F 3/0482; E21B 44/00
  See application file for complete search history.

(56) References Cited

U.S. PATENT DOCUMENTS

| | | | |
|---|---|---|---|
| 6,282,452 B1* | 8/2001 | DeGuzman | E21B 44/00 700/32 |
| 7,539,625 B2* | 5/2009 | Klumpen | G05B 19/41885 705/7.22 |
| 7,653,563 B2* | 1/2010 | Veeningen | G06Q 10/0635 705/7.28 |
| 7,899,658 B2* | 3/2011 | Oliver | E21B 10/00 703/10 |
| 8,952,829 B2* | 2/2015 | Wessling | E21B 47/0002 166/250.01 |
| 9,098,412 B1* | 8/2015 | Marchant | G06F 11/0793 |
| 9,765,571 B2* | 9/2017 | Huang | E21B 10/00 |
| 2009/0132458 A1* | 5/2009 | Edwards | E21B 44/00 706/50 |
| 2014/0121973 A1* | 5/2014 | Buchanan | G05B 23/0221 702/6 |
| 2015/0315903 A1* | 11/2015 | Abbassian | E21B 33/06 702/6 |

(Continued)

*Primary Examiner* — Shen Shiau
(74) *Attorney, Agent, or Firm* — Haynes and Boone, LLP (57) ABSTRACT

A method of managing a drilling anomaly includes providing a computing device comprising a graphical user interface ("GUI") that is configured to display a plurality of screens in response to detection of the drilling anomaly; displaying a first screen that includes a menu listing proposed actions to address the detected drilling anomaly and an estimated success rate associated with each of the proposed actions; wherein each of the proposed actions is selectable by a user via the GUI; receiving, by the computing device and via the GUI, a first selection command associated with a first proposed action from the menu; displaying a second screen that includes a first illustration depicting execution of the first proposed action that was selected by the user via the first selection command; and receiving, by the computing device and via the GUI, a command to execute one of the proposed actions.

20 Claims, 8 Drawing Sheets

(56) References Cited

U.S. PATENT DOCUMENTS

| | | | |
|---|---|---|---|
| 2016/0186552 A1* | 6/2016 | Penn | G05B 15/02 |
| | | | 700/275 |
| 2016/0342916 A1* | 11/2016 | Arceneaux | G06Q 10/06313 |
| 2017/0058656 A1* | 3/2017 | Benson | E21B 44/00 |
| 2017/0364795 A1* | 12/2017 | Anderson | G06N 20/00 |
| 2018/0119535 A1* | 5/2018 | Shen | E21B 44/00 |
| 2019/0292908 A1* | 9/2019 | Karimi Vajargah | |
| | | | E21B 49/003 |
| 2019/0338628 A1* | 11/2019 | Sehsah | E21B 7/04 |

* cited by examiner

CONTEXTUAL DRILLING INTERFACE AND RECOMMENDATION SYSTEM AND METHODS

BACKGROUND

At the outset of a drilling operation, drillers typically establish a drilling plan that includes a target location and a drilling path, or well plan, to the target location. Once drilling commences, the bottom hole assembly ("BHA") is directed or "steered" from a vertical drilling path in any number of directions, to follow the proposed well plan. For example, to recover an underground hydrocarbon deposit, a well plan might include a vertical well to a point above the reservoir, then a directional or horizontal well that penetrates the deposit. The drilling operator may then steer the BHA, including the bit, through both the vertical and horizontal aspects in accordance with the plan.

Often, the drilling operator reviews 4 to 5 screens (e.g., 2 to 3 human machine interfaces ("HMI") and 2 electronic drilling recorder ("EDR") screens) in order to make informed drilling decisions. Generally, the EDR screens present the sensor data channels as enunciators and scroll graphs, and the HMIs present necessary alerts and triggers to send the controls back to the controls systems. This results in drillers having to rely on their muscle memory and previous experiences in order to make decisions, thus rendering them subjective.

SUMMARY

A method of managing a drilling anomaly is disclosed that includes providing a computing device comprising a graphical user interface ("GUI") that is configured to display a plurality of screens in response to detection of the drilling anomaly, displaying a first screen in the plurality of screens, wherein the first screen includes a menu listing proposed actions to address the detected drilling anomaly and an estimated success rate associated with each of the proposed actions; wherein each of the proposed actions is selectable by a user via the GUI; receiving, by the computing device and via the GUI, a first selection command associated with a first proposed action from the proposed actions; displaying a second screen in the plurality of screens, wherein the second screen includes a first illustration depicting execution of the first proposed action that was selected by the user via the first selection command; and receiving, by the computing device and via the GUI, a command to execute one of the proposed actions. In some embodiments, the method also includes receiving, by the computing device, a second selection command associated with a second proposed action that is different from the first proposed action; and displaying a third screen in the plurality of screens, wherein the third screen includes a second illustration depicting execution of the second proposed action that was selected by the user via the second selection command; and wherein the second illustration is different from the first illustration. In some embodiments, the detected drilling anomaly is associated with a drilling operation of a wellbore; and wherein the first illustration is at least one of: an illustration of a bottom-hole-assembly ("BHA") relative to a wellbore through which the BHA extends; an illustration of the BHA relative to other wellbores through which the BHA does not extend; an illustration of a bit that forms a portion of the BHA relative to the wellbore; an illustration of the BHA moving relative to the wellbore through which the BHA extends; or an illustration of a tool associated with the drilling anomaly. In some embodiments, the method also includes displaying a fourth screen in the plurality of screens, wherein the fourth screen explains the estimated success rate associated with the first proposed action that was selected by the user via the first selection command. In some embodiments, one of the proposed actions listed in the menu is a proposed action that the user has executed in response to historical drilling anomalies that are at least substantially the same as, or identical to, the detected drilling anomaly. In some embodiments, the drilling anomaly is at least one of: a stick-slip event; a predicted stick-slip event; a data entry error by the user; a kick detection; a predicted kick event; a high inflow detection; a predicted high inflow event; a deviation from a well plan; or a predicted deviation from the well plan. In some embodiments, the method also includes displaying a fifth screen in the plurality of screens, wherein the fifth screen includes one or more graphs detailing data received from a plurality of sensors; and wherein in response to the detection of the drilling anomaly, the fifth screen identifies the drilling anomaly and identifies portion(s) of the one or more graphs associated with the drilling anomaly. In some embodiments, the method also includes displaying a fifth screen in the plurality of screens, wherein the fifth screen includes one or more graphs detailing data received from a plurality of sensors; wherein the fifth screen further includes a selectable visual alert in response to the detection of the drilling anomaly; and receiving, by the computing device and via the GUI, a selection command associated with the selectable visual alert; and wherein displaying the first screen is in response to receipt of the selection command associated with the selectable visual alert. In some embodiments, the method also includes executing, using the computing device, one of the proposed actions in response to the receipt of the command to execute one of the proposed actions. In some embodiments, the estimated success rate that is associated with each of the proposed actions is based on historical data.

A computing device has been disclosed that includes a graphical user interface ("GUI") configured to display a plurality of screens in response to detection of a drilling anomaly, wherein a first screen in the plurality of screens includes a menu listing proposed actions to address the drilling anomaly and an estimated success rate associated with each of the proposed actions; wherein each of the proposed actions is selectable by a user via the GUI; wherein the computing device is configured to receive a first selection command associated with a first proposed action from the proposed actions, wherein a second screen in the plurality of screens includes a first illustration depicting execution of the first proposed action that was selected by a user via the first selection command; and wherein the computing device is configured to receive, via the GUI, a command to execute one of the proposed actions. In some embodiments, the computing device is configured to receive a second selection command associated with a second proposed action that is different from the first proposed action; wherein a third screen in the plurality of screens includes a second illustration depicting execution of the second proposed action that was selected by the user via the second selection command; and wherein the second illustration is different from the first illustration. In some embodiments, the drilling anomaly is associated with a drilling operation of a wellbore; and wherein the first illustration is one or more of: an illustration of a bottom-hole-assembly ("BHA") relative to a wellbore through which the BHA extends; an illustration of the BHA relative to other wellbores through which the BHA does not extend; an illustration of a bit that forms a portion of the BHA relative to the wellbore; an illustration of the BHA moving relative to the wellbore through which the BHA extends; or an illustration of a tool associated with the drilling anomaly. In some embodiments, a fourth screen in the plurality of screens explains the estimated success rate associated with the first proposed action that was selected by the user via the first selection command. In some embodiments, one of the proposed actions listed in the menu is a proposed action that the user has executed in response to historical drilling anomalies that are at least substantially the same as, or identical to, the detected drilling anomaly. In some embodiments, the drilling anomaly is at least one of: a stick-slip event; a predicted stick-slip event; a data entry error by the user; a kick detection; a predicted kick event; a high inflow detection; a predicted high inflow event; a deviation from a well plan; or a predicted deviation from the well plan. In some embodiments, a fifth screen in the plurality of screens includes one or more graphs detailing data received from a plurality of sensors; and wherein in response to the detection of the drilling anomaly, the fifth screen identifies the drilling anomaly and identifies portion(s) of the one or more graphs associated with the drilling anomaly. In some embodiments, a fifth screen in the plurality of screens includes one or more graphs detailing data received from a plurality of sensors; wherein the fifth screen further displays a selectable visual alert in response to the detection of the drilling anomaly; wherein the computing device is configured to receive a selection command associated with the selectable visual alert; and wherein the computing device is configured to display the first screen in response to receipt of the selection command associated with the selectable visual alert. In some embodiments, the computing device is configured to execute one of the proposed actions in response to the receipt of the command to execute one of the proposed actions. In some embodiments, the estimated success rate that is associated with each of the proposed actions is based on historical data.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

Figure 1:
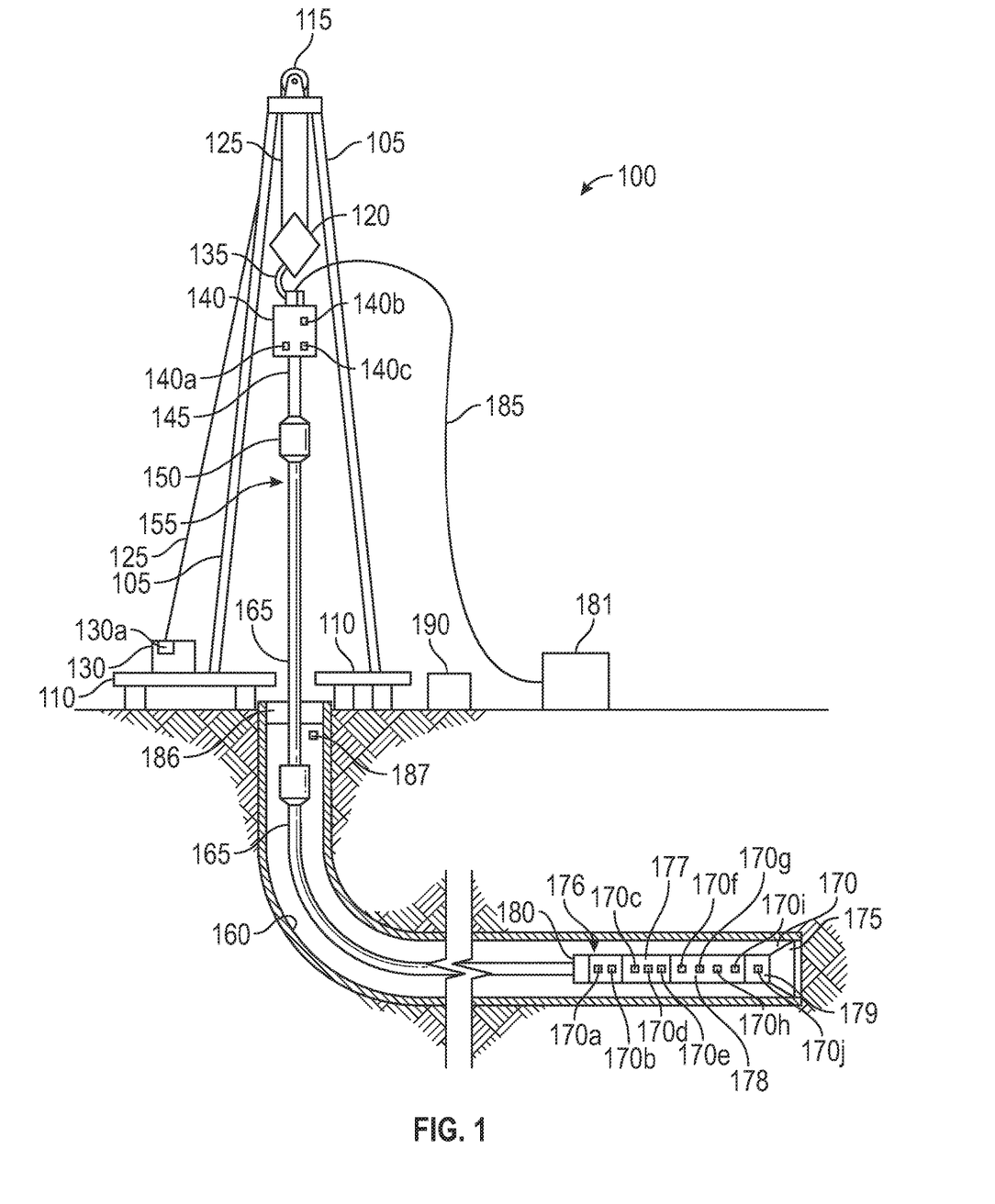
FIG. 1 is a schematic diagram of a drilling rig apparatus including a bottom hole assembly ("BHA") according to one or more aspects of the present disclosure.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Generally, the apparatus 100 monitors, in real-time, drilling operations relating to a wellbore and presents a menu of recommendations or options to correct any detected issues/anomalies. In some embodiments, the apparatus 100 recommends options to correct deviations from a planned well program for the wellbore or otherwise mitigate an unplanned drilling event, which includes data entry errors. An expected success rate for each option and an illustration relating to the option are also presented to the drilling operator. The illustration is dependent upon the option. For example, if the recommendation is to increase the WOB, then the illustration is a 3-D view of the wellbore while the bit drills will be displayed, and if the recommendation is to correct the trajectory to avoid collision with other wellbores, then the illustration is a view in 3-D space of the wellbore and its position relative to other surrounding wellbores.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to draw works 130, which is configured to reel out and reel in the drilling line 125 to cause the traveling block 120 to be lowered and raised relative to the rig floor 110. The draw works 130 may include a rate of penetration ("ROP") sensor 130*a*, which is configured for detecting an ROP value or range, and a controller to feed-out and/or feed-in of a drilling line 125. The other end of the drilling line 125, known as a dead line anchor, is anchored to a fixed position, possibly near the draw works 130 or elsewhere on the rig.

A hook 135 is attached to the bottom of the traveling block 120. A top drive 140 is suspended from the hook 135. A quill 145, extending from the top drive 140, is attached to a saver sub 150, which is attached to a drill string 155 suspended within a wellbore 160. Alternatively, the quill 145 may be attached to the drill string 155 directly.

The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165 and a BHA 170, which includes a drill bit 175. The BHA 170 may include one or more measurement-while-drilling ("MWD") or wireline conveyed instruments 176, flexible connections 177, optional motors 178, adjustment mechanisms 179 for push-the-bit drilling or bent housing and bent subs for point-the-bit drilling, a controller 180, stabilizers, and/or drill collars, among other components. One or more pumps 181 may deliver drilling fluid to the drill string 155 through a hose or other conduit 185, which may be connected to the top drive 140.

The downhole MWD or wireline conveyed instruments 176 may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, sent to the controller 180, and downloaded from the instrument(s) at the surface and/or transmitted real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. The MWD tools and/or other portions of the BHA 170 may have the ability to store measurements for later retrieval via wireline and/or when the BHA 170 is tripped out of the wellbore 160.

In an example embodiment, the apparatus 100 may also include a rotating blow-out preventer ("BOP") 186, such as if the wellbore 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 186. The apparatus 100 may also include a surface casing annular pressure sensor 187 configured to detect the pressure in the annulus defined between, for example, the wellbore 160 (or casing therein) and the drill string 155. It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

In the example embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 may include a downhole annular pressure sensor 170a coupled to or otherwise associated with the BHA 170. The downhole annular pressure sensor 170a may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on).

The apparatus 100 may additionally or alternatively include a shock/vibration sensor 170b that is configured for detecting shock and/or vibration in the BHA 170. The apparatus 100 may additionally or alternatively include a mud motor delta pressure ($\Delta P$) sensor 170c that is configured to detect a pressure differential value or range across the one or more optional motors 178 of the BHA 170. In some embodiments, the mud motor $\Delta P$ may be alternatively or additionally calculated, detected, or otherwise determined at the surface, such as by calculating the difference between the surface standpipe pressure just off-bottom and pressure once the bit touches bottom and starts drilling and experiencing torque. The one or more motors 178 may each be or include a positive displacement drilling motor that uses hydraulic power of the drilling fluid to drive the bit 175, also known as a mud motor. One or more torque sensors, such as a bit torque sensor 172b, may also be included in the BHA 170 for sending data to a controller 190 that is indicative of the torque applied to the bit 175.

The apparatus 100 may additionally or alternatively include a toolface sensor 170e configured to estimate or detect the current toolface orientation or toolface angle. The toolface sensor 170c may be or include a conventional or future-developed gravity toolface sensor which detects toolface orientation relative to the Earth's gravitational field. Alternatively, or additionally, the toolface sensor 170c may be or include a conventional or future-developed magnetic toolface sensor which detects toolface orientation relative to magnetic north or true north. In an example embodiment, a magnetic toolface sensor may detect the current toolface when the end of the wellbore is less than about 7° from vertical, and a gravity toolface sensor may detect the current toolface when the end of the wellbore is greater than about 7° from vertical. However, other toolface sensors may also be utilized within the scope of the present disclosure, including non-magnetic toolface sensors and non-gravitational inclination sensors. The toolface sensor 170c may also, or alternatively, be or include a conventional or future-developed gyro sensor. The apparatus 100 may additionally or alternatively include a WOB sensor 170f integral to the BHA 170 and configured to detect WOB at or near the BHA 170. The apparatus 100 may additionally or alternatively include an inclination sensor 170g integral to the BHA 170 and configured to detect inclination at or near the BHA 170. The apparatus 100 may additionally or alternatively include an azimuth sensor 170h integral to the BHA 170 and configured to detect azimuth at or near the BHA 170. The apparatus 100 may additionally or alternatively include a torque sensor 140*a* coupled to or otherwise associated with the top drive 140. The torque sensor 140*a* may alternatively be located in or associated with the BHA 170. The torque sensor 140*a* may be configured to detect a value or range of the torsion of the quill 145 and/or the drill string 155 (e.g., in response to operational forces acting on the drill string). The top drive 140 may additionally or alternatively include or otherwise be associated with a speed sensor 140*b* configured to detect a value or range of the rotational speed of the quill 145. In some embodiments, the BHA 170 also includes another directional sensor 170*i* (e.g., azimuth, inclination, toolface, combination thereof, etc.) that is spaced along the BHA 170 from one or another directional sensor (e.g., the inclination sensor 170*g*, the azimuth sensor 170*h*). For example, and in some embodiments, the sensor 170*i* is positioned in the MWD 176 and the another directional sensor is positioned in the adjustment mechanism 179, with a known distance between them, for example 20 feet, configured to estimate or detect the current toolface orientation or toolface angle. The sensors 170*a*-170*j* are not limited to the arrangement illustrated in FIG. 1 and may be spaced along the BHA 170 in a variety of configurations.

The top drive 140, the draw works 130, the crown block 115, the traveling block 120, drilling line or dead line anchor may additionally or alternatively include or otherwise be associated with a WOB or hook load sensor 140*c* (WOB calculated from the hook load sensor that can be based on active and static hook load) (e.g., one or more sensors installed somewhere in the load path mechanisms to detect and calculate WOB, which can vary from rig-to-rig) different from the WOB sensor 170*f*. The WOB sensor 140*f* may be configured to detect a WOB value or range, where such detection may be performed at the top drive 140, the draw works 130, or other component of the apparatus 100. Generally, the hook load sensor 140*c* detects the load on the hook 135 as it suspends the top drive 140 and the drill string 155.

The detection performed by the sensors described herein may be performed once, continuously, periodically, and/or at random intervals. The detection may be manually triggered by an operator or other person accessing a human-machine interface ("HMI") or GUI, or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

In some embodiments, the controller 180 is configured to control or assist in the control of one or more components of the apparatus 100. For example, the controller 180 may be configured to transmit operational control signals to the controller 190, the draw works 130, the top drive 140, other components of the BHA 170 such as the adjustment mechanism 179, and/or the pump 181. The controller 180 may be a stand-alone component that forms a portion of the BHA 170 or be integrated in the adjustment mechanism 179 or another sensor that forms a portion of the BHA 170. The controller 180 may be configured to transmit the operational control signals or instructions to the draw works 130, the top drive 140, other components of the BHA 170, and/or the pump 181 via wired or wireless transmission means which, for the sake of clarity, are not depicted in FIG. 1.

The apparatus 100 also includes the controller 190 configured to control or assist in the control of one or more components of the apparatus 100. For example, the controller 190 may be configured to transmit operational control signals to the draw works 130, the top drive 140, the BHA 170 and/or the pump 181. The controller 190 may be a stand-alone component installed near the mast 105 and/or other components of the apparatus 100. In an example embodiment, the controller 190 includes one or more systems located in a control room proximate the mast 105, such as the general-purpose shelter often referred to as the "doghouse" serving as a combination tool shed, office, communications center, and general meeting place. The controller 190 may be configured to transmit the operational control signals to the draw works 130, the top drive 140, the BHA 170, and/or the pump 181 via wired or wireless transmission means which, for the sake of clarity, are not depicted in FIG. 1.

In some embodiments, the controller 190 is not operably coupled to the top drive 140, but instead may include other drive systems, such as a power swivel, a rotary table, a coiled tubing unit, a downhole motor, and/or a conventional rotary rig, among others.

In some embodiments, the controller 190 controls the flow rate and/or pressure of the output of the mud pump 181.

In some embodiments, the controller 190 controls the feed-out and/or feed-in of the drilling line 125, rotational control of the draw works (in v. out) to control the height or position of the hook 135, and may also control the rate the hook 135 ascends or descends. However, example embodiments within the scope of the present disclosure include those in which the draw-works-drill-string-feed-off system may alternatively be a hydraulic ram or rack and pinion type hoisting system rig, where the movement of the drill string 155 up and down is via something other than the draw works 130. The drill string 155 may also take the form of coiled tubing, in which case the movement of the drill string 155 in and out of the hole is controlled by an injector head which grips and pushes/pulls the tubing in/out of the hole. Nonetheless, such embodiments may still include a version of the draw works controller, which may still be configured to control feed-out and/or feed-in of the drill string 155.

Generally, the apparatus 100 also includes a hook position sensor that is configured to detect the vertical position of the hook 135, the top drive 140, and/or the travelling block 120. The hook position sensor may be coupled to, or be included in, the top drive 140, the draw works 130, the crown block 115, and/or the traveling block 120 (e.g., one or more sensors installed somewhere in the load path mechanisms to detect and calculate the vertical position of the top drive 140, the travelling block 120, and the hook 135, which can vary from rig-to-rig). The hook position sensor is configured to detect the vertical distance the drill string 155 is raised and lowered, relative to the crown block 115. In some embodiments, the hook position sensor is a draw works encoder, which may be the ROP sensor 130*a*. In some embodiments, the apparatus 100 also includes a rotary RPM sensor that is configured to detect the rotary RPM of the drill string 155. This may be measured at the top drive 140 or elsewhere, such as at surface portion of the drill string 155. In some embodiments, the apparatus 100 also includes a quill position sensor that is configured to detect a value or range of the rotational position of the quill 145, such as relative to true north or another stationary reference. In some embodiments, the apparatus 100 also includes a pump pressure sensor that is configured to detect the pressure of mud or fluid that powers the BHA 170 at the surface or near the surface. In some embodiments, the apparatus also includes a MSE sensor that is configured to detect the MSE representing the amount of energy required per unit volume of drilled rock. In some embodiments, the MSE is not directly sensed, but is calculated based on sensed data at the controller 190 or other controller. In some embodiments, the apparatus 100 also includes a bit depth sensor that detects the depth of the bit 175.

Figure 2:
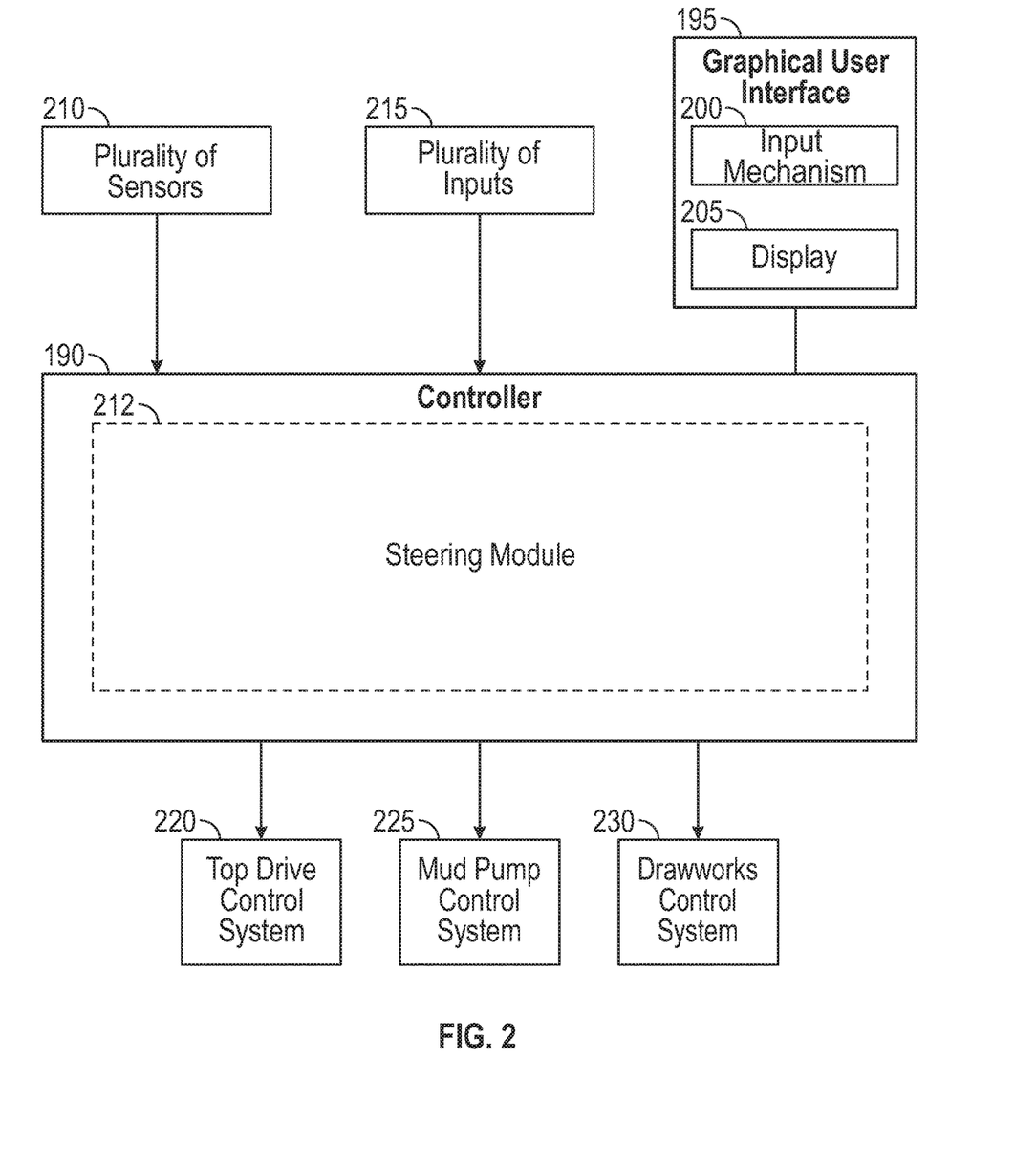
FIG. 2 is a schematic illustration of a portion of the apparatus of FIG. 1, according to one or more aspects of the present disclosure, the apparatus including a graphical user interface ("GUI").

FIG. 2 is a diagrammatic illustration of a data flow involving at least a portion of the apparatus 100 according to one embodiment. Generally, the controller 190 is operably coupled to or includes a GUI 195. The GUI 195 includes an input mechanism 200 for user-inputs or drilling parameters. The input mechanism 200 may include a touch-screen, keypad, voice-recognition apparatus, dial, button, switch, slide selector, toggle, joystick, mouse, data base and/or other conventional or future-developed data input device. Such input mechanism 200 may support data input from local and/or remote locations. Alternatively, or additionally, the input mechanism 200 may include means for user-selection of input parameters, such as predetermined toolface set point values or ranges, such as via one or more drop-down menus, input windows, etc. Drilling parameters may also or alternatively be selected by the controller 190 via the execution of one or more database look-up procedures. In general, the input mechanism 200 and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other means. The GUI 195 may also include a display 205 for visually presenting information to the user in textual, graphic, or video form. The display 205 may also be utilized by the user to input the input parameters in conjunction with the input mechanism 200. For example, the input mechanism 200 may be integral to or otherwise communicably coupled with the display 205. The GUI 195 and the controller 190 may be discrete components that are interconnected via wired or wireless means. Alternatively, the GUI 195 and the controller 190 may be integral components of a single system or controller. The controller 190 is configured to receive electronic signals via wired or wireless transmission means (also not shown in FIG. 1) from a plurality of sensors 210 included in the apparatus 100, where each sensor is configured to detect an operational characteristic or parameter. The controller 190 also includes a steering module 212 to control a drilling operation. The steering module 212 may include a variety of sub modules, such as a trapped torque module, an oscillation module, a tag bottom module, an obtain target toolface angle module, a maintain toolface angle module, and an evaluation mode module. Generally, each of the modules is associated with a predetermined workflow or recipe that executes a task from beginning to end. Often, the predetermined workflow includes a set of computer-implemented instructions for executing the task from beginning to end, with the task being one that includes a repeatable sequence of steps that take place to implement the task. The steering module 212 generally implements the task of completing a steering operation, which steers the BHA along the planned drilling path. The controller 190 is also configured to: receive a plurality of inputs 215 from a user via the input mechanism 200; and/or look up a plurality of inputs from a database. In some embodiments, the plurality of inputs 215 includes the well plan input, a maximum WOB input, a top drive input, a draw works input, a mud pump input, and equipment identification input, etc. As shown, the controller 190 is also operably coupled to a top drive control system 220, a mud pump control system 225, and a draw works control system 230, and is configured to send signals to each of the control systems 220, 225, and 230 to control the operation of the top drive 140, the mud pump 181, and the draw works 130. However, in other embodiments, the controller 190 includes each of the control systems 220, 225, and 230 and thus sends signals to each of the top drive 140, the mud pump 181, and the draw works 130.

In some embodiments, the top drive control system 220 includes the top drive 140, the speed sensor 140b, the torque sensor 140a, and the hook load sensor 140c. The top drive control system 220 is not required to include the top drive 140, but instead may include other drive systems, such as a power swivel, a rotary table, a coiled tubing unit, a downhole motor, and/or a conventional rotary rig, among others.

In some embodiments, the mud pump control system 225 includes a mud pump controller and/or other means for controlling the flow rate and/or pressure of the output of the mud pump 181.

In some embodiments, the draw works control system 230 includes the draw works controller and/or other means for controlling the feed-out and/or feed-in of the drilling line 125. Such control may include rotational control of the draw works (in v. out) to control the height or position of the hook 135, and may also include control of the rate the hook 135 ascends or descends. However, example embodiments within the scope of the present disclosure include those in which the draw works-drill-string-feed-off system may alternatively be a hydraulic ram or rack and pinion type hoisting system rig, where the movement of the drill string 155 up and down is via something other than the draw works 130. The drill string 155 may also take the form of coiled tubing, in which case the movement of the drill string 155 in and out of the hole is controlled by an injector head which grips and pushes/pulls the tubing in/out of the hole. Nonetheless, such embodiments may still include a version of the draw works controller, which may still be configured to control feed-out and/or feed-in of the drill string.

The plurality of sensors 210 may include the ROP sensor 130a; the torque sensor 140a; the quill speed sensor 140b; the hook load sensor 140c; the surface casing annular pressure sensor 187; the downhole annular pressure sensor 170a; the shock/vibration sensor 170b; the toolface sensor 170c; the MWD WOB sensor 170d; the mud motor delta pressure sensor 172a; the bit torque sensor 172b; the hook position sensor 235; a rotary RPM sensor 240; a quill position sensor 242; a pump pressure sensor 245; a MSE sensor 246; a bit depth sensor 252; and any variation thereof. The data detected by any of the sensors in the plurality of sensors 210 may be sent via electronic signal to the controller 190 via wired or wireless transmission. The functions of the sensors 130a, 140a, 140b, 140c, 187, 170a, 170b, 170c, 170d, 172a, and 172b are discussed above and will not be repeated here.

Generally, the hook position sensor 235 is configured to detect the vertical position of the hook 135, the top drive 140, and/or the travelling block 120. The hook position sensor 235 may be coupled to, or be included in, the top drive 140, the draw works 130, the crown block 115, and/or the traveling block 120 (e.g., one or more sensors installed somewhere in the load path mechanisms to detect and calculate the vertical position of the top drive 140, the travelling block 120, and the hook 135, which can vary from rig-to-rig). The hook position sensor 235 is configured to detect the vertical distance the drill string 155 is raised and lowered, relative to the crown block 115. In some embodiments, the hook position sensor 235 is a draw works encoder, which may be the ROP sensor 130*a*.

Generally, the rotary RPM sensor 240 is configured to detect the rotary RPM of the drill string 155. This may be measured at the top drive 140 or elsewhere, such as at surface portion of the drill string 155.

Generally, the quill position sensor 242 is configured to detect a value or range of the rotational position of the quill 145, such as relative to true north or another stationary reference.

Generally, the pump pressure sensor 245 is configured to detect the pressure of mud or fluid that powers the BHA 170 at the surface or near the surface.

Generally, the MSE sensor 246 is configured to detect the MSE representing the amount of energy required per unit volume of drilled rock. In some embodiments, the MSE is not directly sensed, but is calculated based on sensed data at the controller 190 or other controller.

Generally, the bit depth sensor 252 detects the depth of the bit 175.

In some embodiments the top drive control system 220 includes the torque sensor 140*a*, the quill position sensor 242, the hook load sensor 140*c*, the pump pressure sensor 245, the MSE sensor 246, and the rotary RPM sensor 240, and a controller and/or other means for controlling the rotational position, speed and direction of the quill or other drill string component coupled to the drive system (such as the quill 145 shown in FIG. 1). The top drive control system 220 is configured to receive a top drive control signal from the steering module 212, if not also from other components of the apparatus 100. The top drive control signal directs the position (e.g., azimuth), spin direction, spin rate, and/or oscillation of the quill 145.

In some embodiments, the draw works control system 230 comprises the hook position sensor 235, the ROP sensor 130*a*, and the draw works controller and/or other means for controlling the length of drilling line 125 to be fed-out and/or fed-in and the speed at which the drilling line 125 is to be fed-out and/or fed-in.

In some embodiments, the mud pump control system 225 comprises the pump pressure sensor 245 and the motor delta pressure sensor 172*a*.

Figure 3:
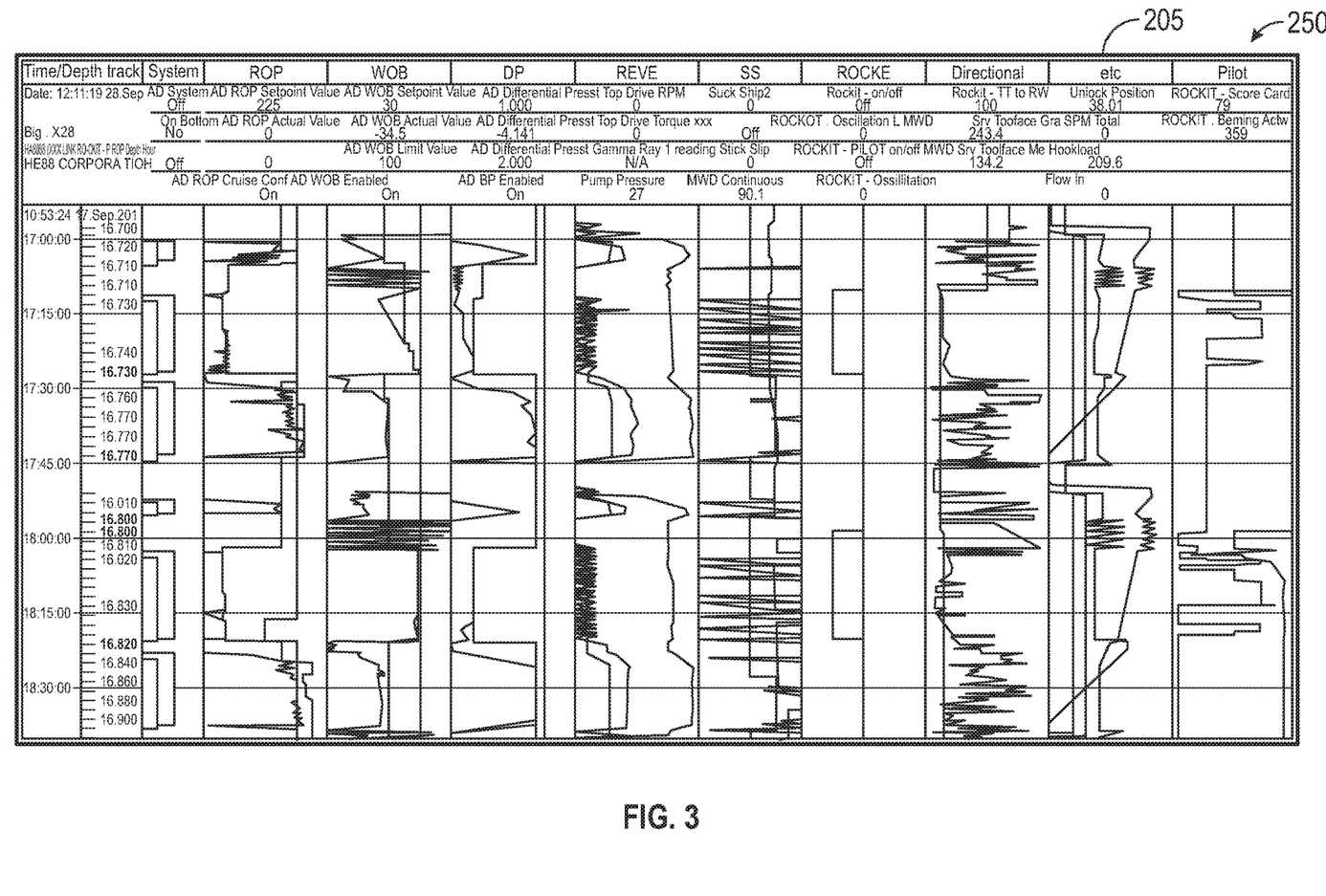
FIG. 3 is a screen that is displayed on the GUI of FIG. 1, according to one or more aspects of the present disclosure.
Figure 4:
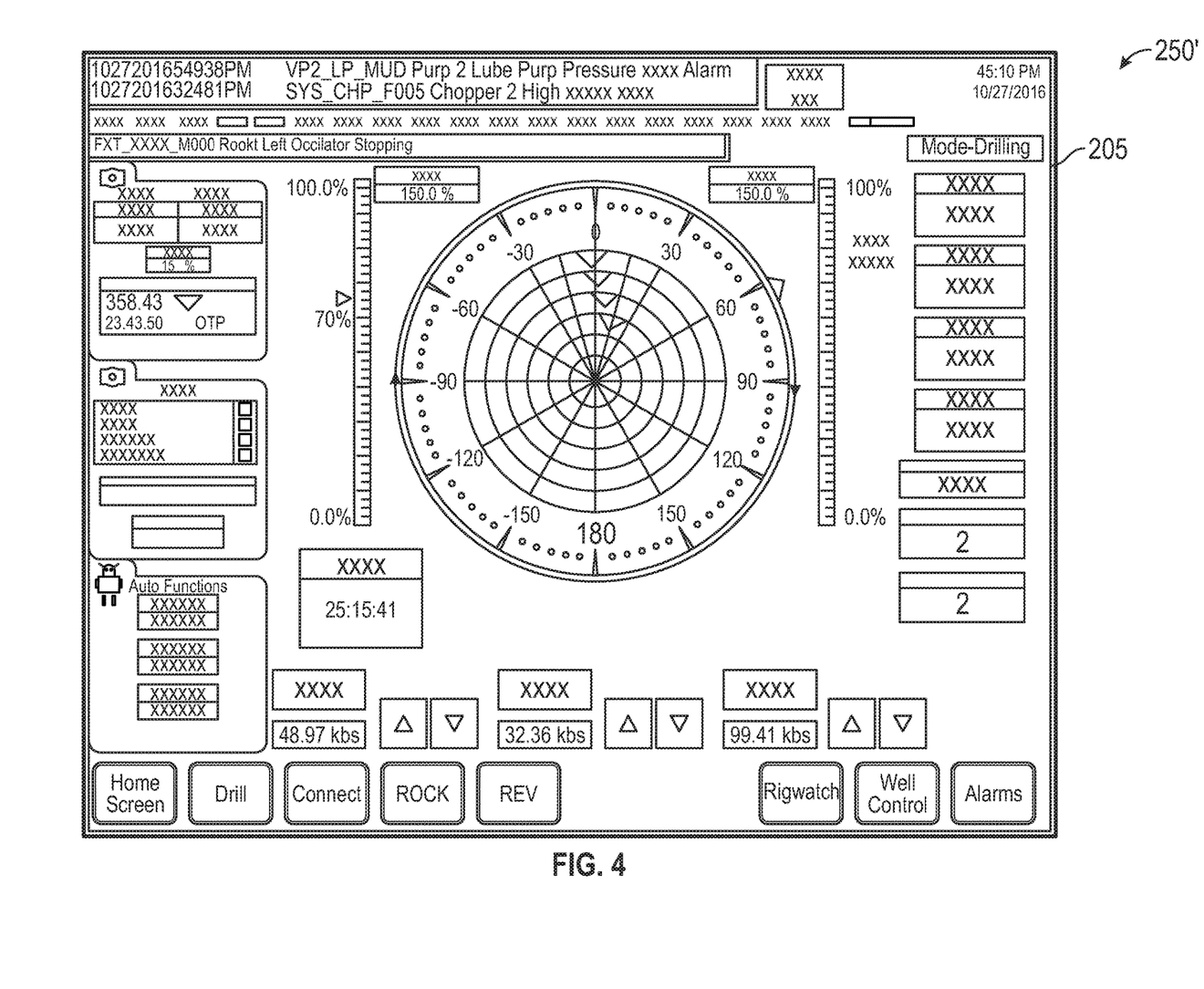
FIG. 4 is another screen that is displayed on the GUI of FIG. 1, according to one or more aspects of the present disclosure.

In some embodiments, the apparatus 100 is configured to monitor drilling operations using the plurality of sensors 210, detect drilling anomalies during the drilling operations, propose actions to mitigate or address the drilling anomalies via the GUI 195, and execute a selected proposed action via the controller 190 and any one or more of the top drive controller system 220, the mud pump control system 225, and the draw works control system 230. Generally, the well program is stored or accessible to the controller 190 so that the controller 190 is capable of comparing the current well path or well path trajectory with the planned or ideal well path. Generally, the GUI 195 is configured to display a plurality of screens relating to the drilling operations. For example, and as illustrated in FIG. 3, the GUI 195 displays a screen 250 on the display 205. In some embodiments, the screen 250 includes one or more scroll graphs that detail data received from the plurality of sensors 210. In some embodiments, the one or more scroll graphs have two perpendicular axes. The scroll graph depicts a value of a category (along a first axis) over time (along the second axis). Generally, instead of displaying the entire history of the scroll graph, only a relevant, most-recent portion of the second axis is displayed to the user. Thus, as new measurements are recorded and displayed by the scroll graph, a portion of the oldest measurements are hidden from view to maintain a specific amount of time along the second axis. For example, the scroll graph illustrates measurements received/recorded over the past 10 minutes, the past 15 minutes, the past hour, etc. In some embodiments, the specific amount of time can be set by the user. In some embodiments, the scroll graph depicts a value of a category (along the first axis) over a depth (along the second axis). However, a variety of screens can be displayed that detail data received from the plurality of sensors 210, such as for example a screen 250' of FIG. 4 that includes an illustration having a dial or target shape having a plurality of concentric nested rings to represent the drilling direction of the BHA 170.

Figure 5:
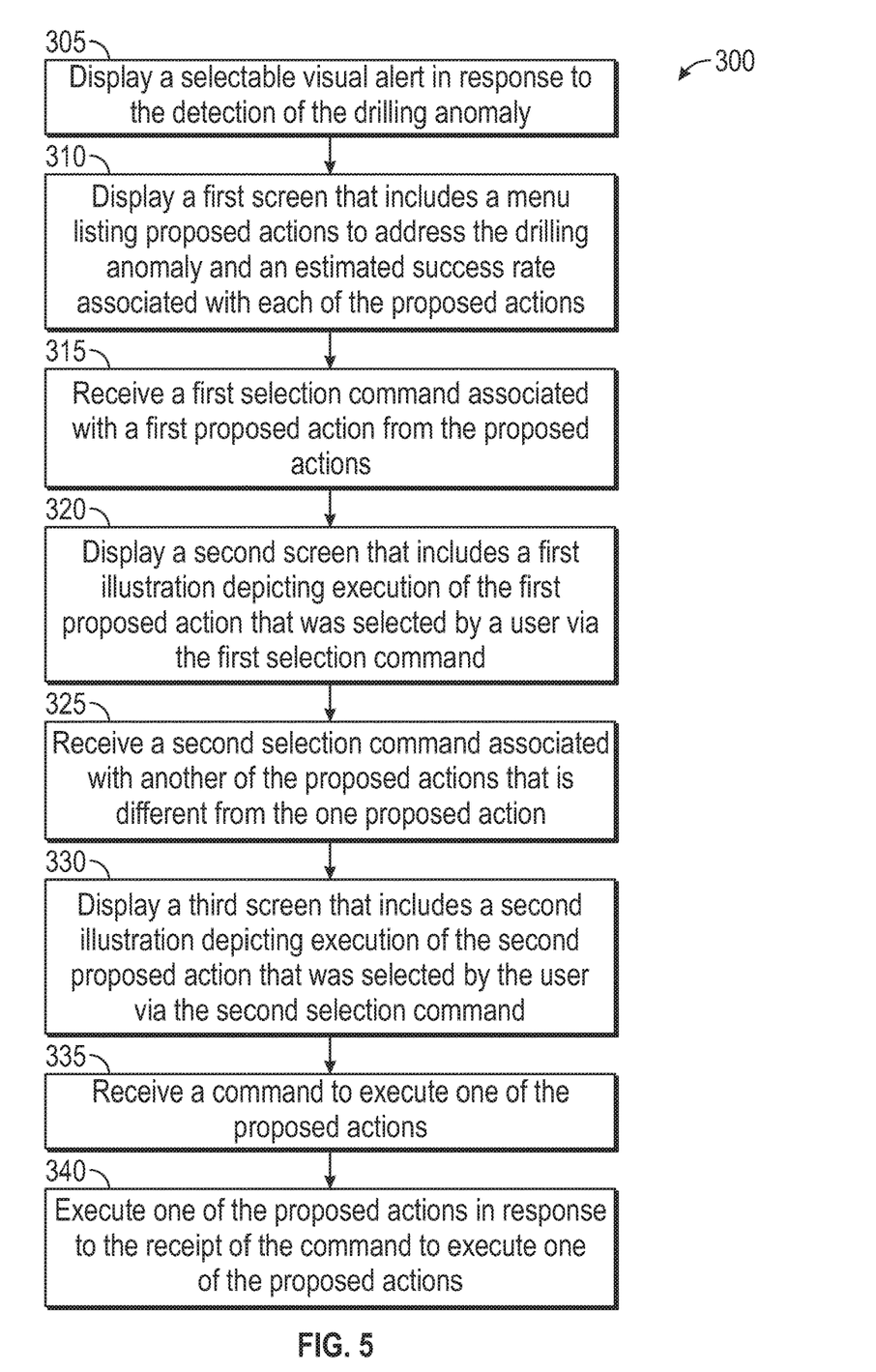
FIG. 5 is a flow-chart diagram of a method according to one or more aspects of the present disclosure.

In an example embodiment, as illustrated in FIG. 5 with continuing reference to FIGS. 1-4, a method 300 of operating the apparatus 100 includes displaying a selectable visual alert in response to the detection of a drilling anomaly at step 305; displaying a first screen that includes a menu listing proposed actions to address the drilling anomaly and an estimated success rate associated with each of the proposed actions at step 310; receiving a first selection command associated with a first proposed action from the proposed actions at step 315; displaying a second screen that includes a first illustration depicting execution of the first proposed action that was selected by a user via the first selection command at step 320; receiving a second selection command associated with another of the proposed actions that is different from the one proposed action at step 325; displaying a third screen that includes a second illustration depicting execution of the second proposed action that was selected by the user via the second selection command at step 330; receiving a command to execute one of the proposed actions at step 335; and executing one of the proposed actions in response to the receipt of the command to execute one of the proposed actions at step 340.

Figure 6:
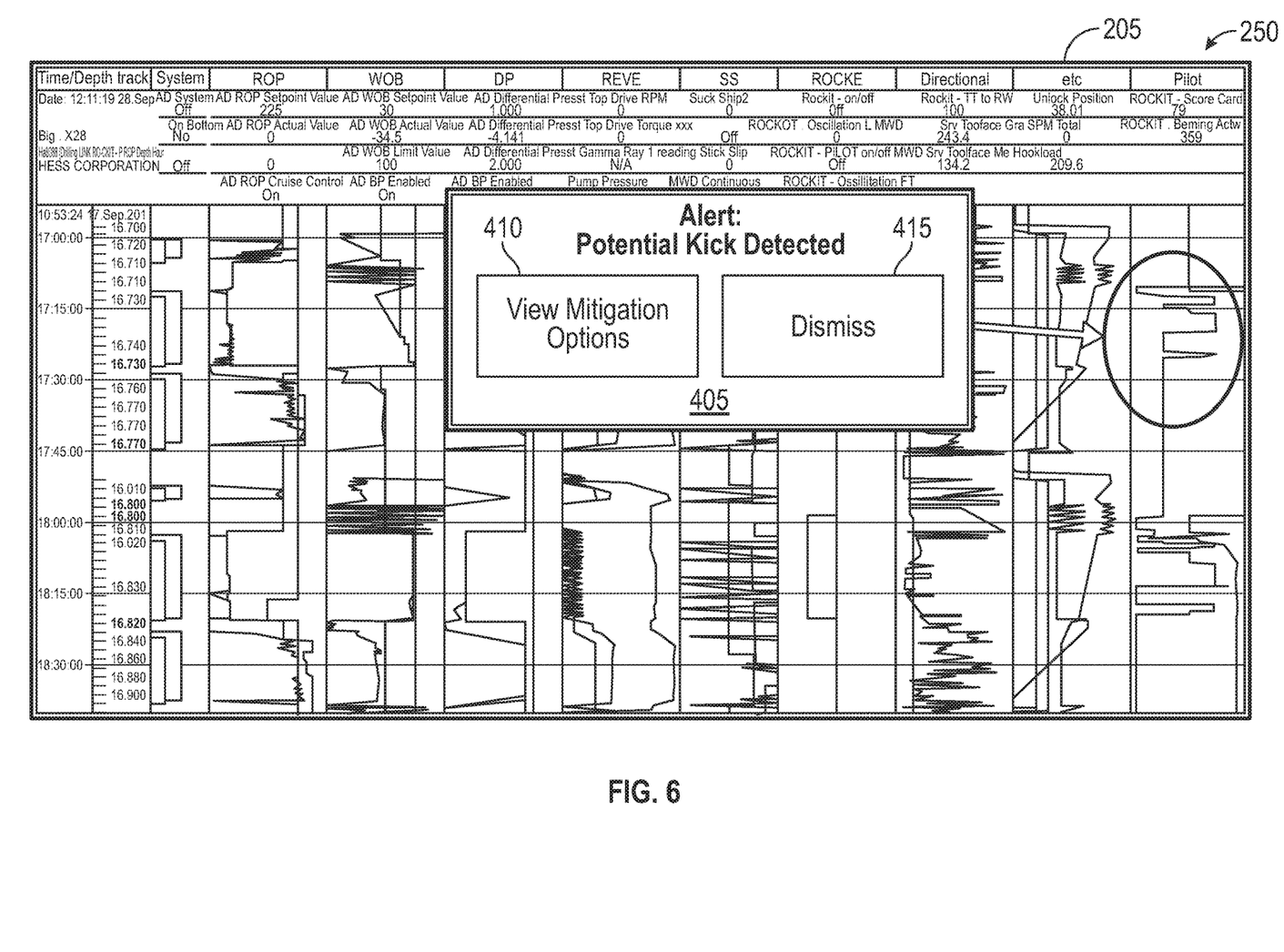
FIG. 6 is a screen that is displayed on the GUI of FIG. 1, according to one or more aspects of the present disclosure.

At the step 305, a selectable alert is displayed on the GUI 195 in response to the detection of a drilling anomaly. In one embodiment and as illustrated in FIG. 6, the apparatus 100 monitors the drilling conditions and data received from the plurality of sensors 210 and displays this data via scroll graphs. When the drilling conditions or data received from the sensors 210 exceeds or falls below a predetermined threshold, fits a predetermined pattern, or otherwise is classified as a drilling anomaly, the apparatus 100 displays an alert 405 on the screen 250 to alert the user of the detected drilling anomaly. The alert 405 identifies the detected drilling anomaly and provides a selectable option 410 to view mitigation options, which are configured to mitigate the detected drilling anomaly, and a selectable option 415 to dismiss the alert 405. In some embodiments, the alert 405 also identifies the data that prompted the alert, such as for example highlighting, circling, or otherwise drawing the user's attention to a portion of the screen 250. As illustrated, a drilling anomaly includes a potential anomaly, which is a situation in which the drilling conditions and data received is trending towards a drilling anomaly, and a detected anomaly, which is a situation in which the drilling conditions and data have been classified as a drilling anomaly. In some embodiments, the drilling anomaly includes any one or more of a stick-slip event; a predicted stick-slip event; a data entry error by the user; a potential data entry error by the user; a kick detection; a predicted kick event; a high inflow detection; a predicted high inflow event; a deviation from a well plan; or a predicted deviation from the well plan. Generally, the drilling anomaly is an undesired event that hinders or could hinder the optimum performance of drilling operations. For example, a drilling anomaly includes: a slower ROP being detected when the optimum ROP being prescribed is much higher; an anomaly being detected downhole which can cause a mud motor stall or bit wear that would result in an unplanned trip out thereby increasing the non-productive time spent on the well; and/or slower trip speeds being detected that can also contribute to the increase in non-productive time spent on the well.

Figure 7:
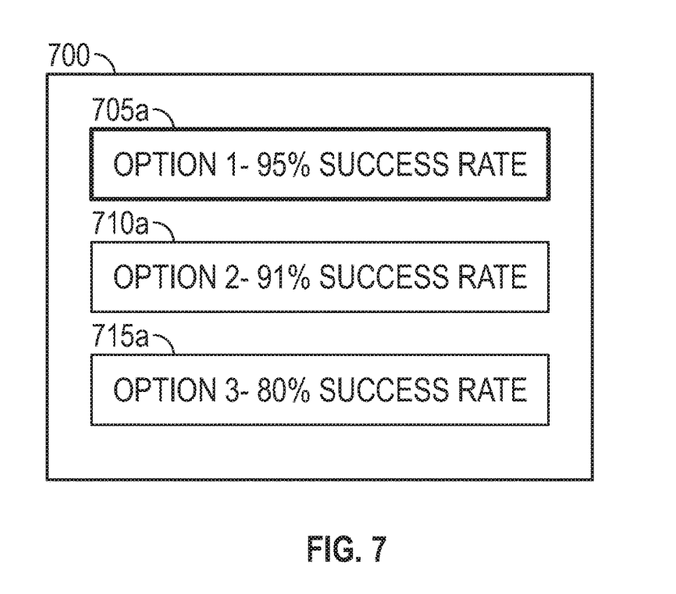
FIG. 7 is another screen that is displayed on the GUI of FIG. 1, according to one or more aspects of the present disclosure.

At the step 310 and referring to FIG. 7, a screen 700 that includes a menu listing proposed actions to address the drilling anomaly and an estimated success rate associated with each of the proposed actions is displayed on the GUI 195. As illustrated, the screen 700 includes three proposed actions, which are configured to mitigate the anomaly detected by the apparatus 100. In some embodiments, a description of each option is also displayed on the screen 700. Each option 705a, 710a, and 715a is associated with an estimated success rate. In some embodiments, the estimated success rate is a historical success rate of implementing the proposed action. In some embodiments, the historical success rate is based on historical data related to: the drilling operation of the wellbore 160; the drilling operation of wellbores surrounding the wellbore 160; the drilling operation of any wellbore; drilling operations using the specific type of equipment used in the drilling operation of the wellbore 160; and/or the user's success rate, etc. In some embodiments, the success rate is an expected success rate. In some embodiments, the expected success rate is based on any type of historical data and the drilling conditions associated with the wellbore 160. The historical data may be identical to the current drilling conditions, or it may relate to drilling conditions and data that are only substantially the same as the current situation. As used herein, the term "substantially the same" can be understood to mean similar historical conditions likely to lead to the same result in the present, e.g., based on a similar geologic formation and the same drilling conditions or the same geologic formation and similar drilling conditions, or the like. In the event the above wording is insufficiently precise, the term "substantially the same" could also be understood herein to mean current numerical values that are up to about ten percent (10%) above or below the historical data, or historical data which are up to about ten percent (10%) above or below the current condition.

At the step 315, a first selection command associated with a first proposed action from the proposed actions is received by the apparatus 100 via the GUI 195. Generally, the first selection command is received via the GUI 195 when the user selects one of the options 705a, 710a, or 715a. However, the first selection command can be received via an oral command or other type of input via the input mechanism 200.

Figure 8:
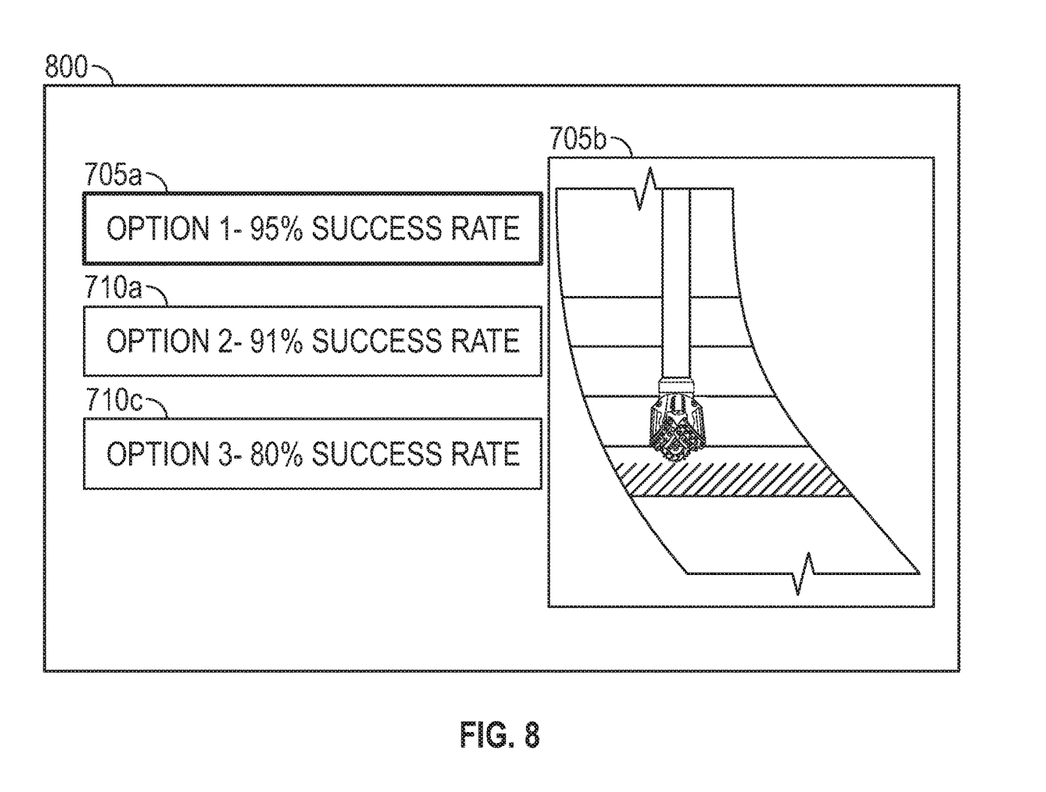
FIG. 8 is another screen that is displayed on the GUI of FIG. 1, according to one or more aspects of the present disclosure.

At the step 320 and as illustrated in FIG. 8, a screen 800 that includes a first illustration depicting execution of the first proposed action that was selected by a user via the first selection command is displayed on the GUI 195. For example, and as illustrated in FIG. 8, when the user selects the option 705a, an illustration 705b that depicts the execution of the option 705a is displayed on the screen 800. The type of illustration is dependent upon the type of proposed action selected. Thus, the apparatus 100 is a contextual drilling interface and recommendation system. That is, the GUI 195 displays an illustration that best depicts the execution of the proposed action, or recommendation. For example, when the option relates to increasing the WOB, the illustration is or involves a 3D view of the wellbore 160 while the bit 175 is drilling; when the option relates to correcting the trajectory of the wellbore 160 to avoid collision with other wellbores, the illustration is or involves a view in 3D space of the wellbore 160 in comparison to the other, surrounding wells within defined perimeters. Another example includes a drilling anomaly of a slower ROP being detected when the optimum ROP being prescribed is much higher. In this instance, the illustration displayed includes a 2D well bore space showing the bit 175 drilling with prescribed ROP compared to actual, which includes an indication of how slow the actual is compared to prescribed optimum. In some embodiments, specific colors are used to indicate the degree of speed differentiation, where red is very slow and orange is a little slow, etc. Yet another example of an anomaly is an anomaly being detected downhole which can cause a mud motor stall or bit wear that would result in an unplanned trip out. In this instance, the illustration includes a 2D well bore space showing the bit 175 drilling ahead and the probability of wear or motor stall. Yet another example of a drilling anomaly is slower trip speeds being detected, which can also contribute to the increase in non-productive time spent on the well. In this instance, the illustration includes a schematic of the rig with mast 105, traveling block 120 etc. indicating how fast the blocks are moving and how fast are the connection times. As illustrated in FIG. 8, the illustration depicts or illustrates the bit 175 relative to the wellbore 160.

Another example of a detected drilling anomaly involves a jump in depth from 1,000 ft. to 5,000 ft. In this example, the option 705a is to reset the depth and the illustration 705b illustrates the jump in depth or illustrates the depth being reset. That is, the drilling anomaly is not limited to an unplanned, drilling event, but can include operator error such as accidentally entering an incorrect depth. As such, incorrect data entry is one type of drilling anomaly that is detected by the apparatus 100.

At the step 325, a second selection command associated with another of the proposed actions that is different from the one proposed action is received by the apparatus 100 via the GUI 195.

Figure 9:
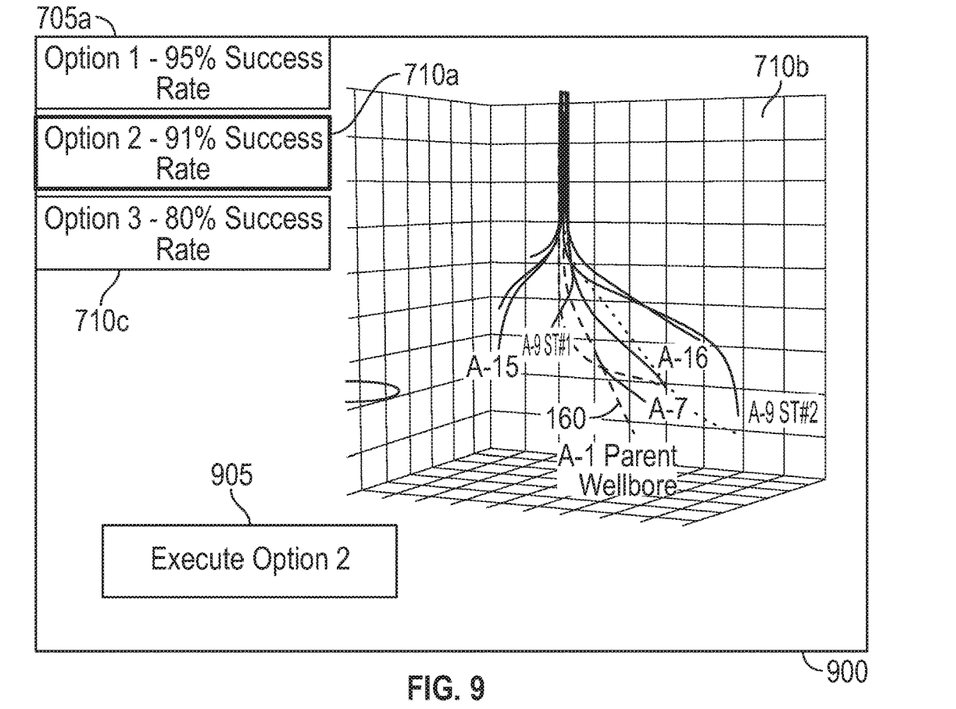
FIG. 9 is another screen that is displayed on the GUI of FIG. 1, according to one or more aspects of the present disclosure.

At the step 330 and as illustrated in FIG. 9, a screen 900 that includes a second illustration depicting execution of the second proposed action that was selected by the user via the second selection command is displayed on the GUI 195. For example, and as illustrated in FIG. 9, when the user selects the option 710a, an illustration 710b that depicts the execution of the option 710a is displayed on the screen 900. As shown, the illustration 710b is different from the illustration 705b.

At the step 335, a command to execute one of the proposed actions is received by the apparatus 100 via the GUI 195. In some embodiments and as illustrated in FIG. 9, a selectable button 905 enables the user to direct the apparatus 100 to execute the selected proposed action. In another embodiment, the button 905 alternatively may be configured to directly cause the apparatus 100 to execute the proposed action with the greatest likelihood of success in reducing, minimizing, or eliminating the anomaly (or of doing so the fastest) without need to separately select a proposed action.

At the step 340, the apparatus 100 executes one of the proposed actions in response to the receipt of the command to execute one of the proposed actions. In some embodiments, the controller 190, along with the top drive controller system 220, the mud pump control system 225, and the draw works control system 230 automatically execute the selected proposed action without, or with very little, user interaction. That is, the selection of the button 905 initiates a workflow associated with the selected proposed action that is automatically executed by the apparatus 100. In other embodiments, additional screens are presented to the user to guide the user in the execution of the selected proposed action. That is, the apparatus 100 guides the user through the workflow for the user to approve of each sub step of the workflow.

Generally, the options 705a, 710a, and 715a are ranked and presented based on the success rate. That is, the first option is generally the option with the highest success rate. In some embodiments, the four options with the highest success rates will be presented. However, in some embodiments, one of the options presented may not have one of the highest success rates but is presented because it is the option that the user historically implements. For example, and based on the historical data associated with the user, if the user normally chooses to reduce the WOB by e.g., 10%, in response to a detected drilling anomaly, then one of the options presented will be to reduce the WOB by 10% along with the associated success rate. This allows the user to compare his or her normally implemented option with the other options presented. In some embodiments, reasoning is provided for the success rate. Thus, the user can select his or her normally implemented option and see the reasoning for that option having a lower success rate than another option. This allows transparency for the user and can increase implementation rates for options with higher success rates.

In some embodiments, the step 305 is omitted and the apparatus 100 automatically displays the screen 700 after the apparatus 100 detects an anomaly or a predicted anomaly.

Using the apparatus 100 and/or the method 300, which detects an anomaly or predicted anomaly and subsequently displays the alert 405 for this anomaly, allows the consolidation of the multiple monitors/screens into a single GUI or a single user interface. In some embodiments, the screens 700, 800, and 900 are overlaid over the screen 250. In one embodiment, only a single display is shown to the user.

In some embodiments, the use of the apparatus 100 and/or implementation of the method 300 removes or reduces the number of subjective decisions, which are made by the user when the user relies on their muscle memory and previous experiences in order to detect and react to a drilling anomaly (e.g., real-time, unplanned drilling events). In some embodiments, the user of the apparatus 100 and/or implementation of the method 300 reduces the time required to detect a drilling anomaly, detect a predicted drilling anomaly, present options to mitigate the anomaly, and execute the option. Quickly responding to real-time, unplanned drilling events often prevents equipment failure and/or well control issues.

Thus, the method 300 and/or the apparatus 100 involves or is an improved user interface for computing devices at least in part due to the particular manner of summarizing and presenting information on the GUI 195. The screens 700, 800, and 900 list a limited set of data and restrains the type of data that can be displayed. Displaying the button 905 to automatically execute an option results in the real-time, unplanned drilling events being quickly resolved, which reduces the likelihood or frequency of equipment failure and/or well control issues.

Methods within the scope of the present disclosure may be local or remote in nature. These methods, and any controllers discussed herein, may be achieved by one or more intelligent adaptive controllers, programmable logic controllers, artificial neural networks, and/or other adaptive and/or "learning" controllers or processing apparatus. For example, such methods may be deployed or performed via PLC, PAC, PC, one or more servers, desktops, handhelds, and/or any other form or type of computing device with appropriate capability.

The term "about," as used herein, should generally be understood to refer to both numbers in a range of numerals. For example, "about 1 to 2" should be understood as "about 1 to about 2." Moreover, all numerical ranges herein should be understood to include each whole integer, or ⅒ of an integer, within the range.

Figure 10:
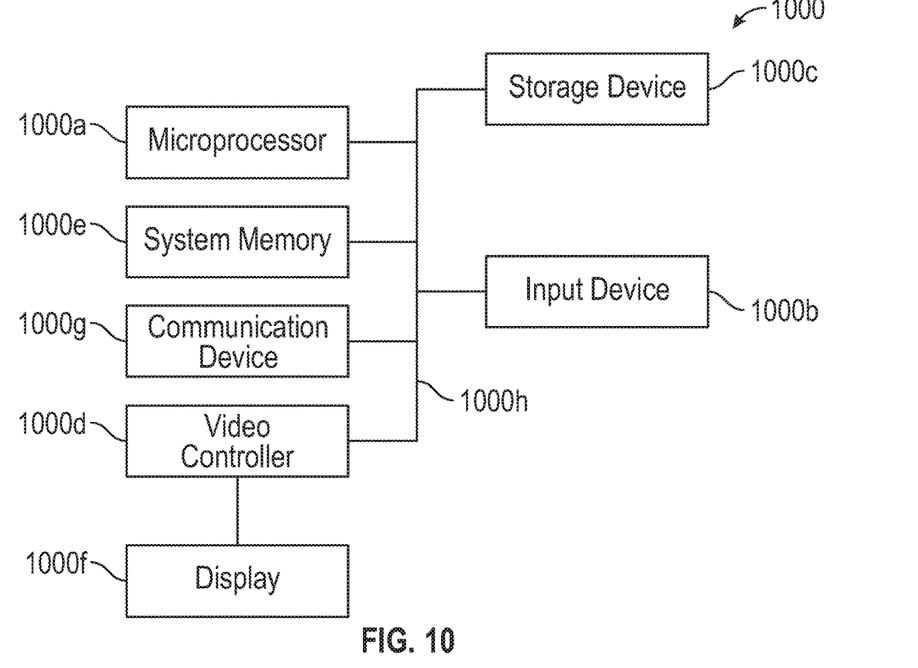
FIG. 10 is a diagrammatic illustration of a node for implementing one or more example embodiments of the present disclosure, according to an example embodiment.

In an example embodiment, as illustrated in FIG. 10 with continuing reference to FIGS. 1-9, an illustrative node 1000 for implementing one or more embodiments of one or more of the above-described networks, elements, methods and/or steps, and/or any combination thereof, is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable non-transitory medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, and cell phones.

In several example embodiments, one or more of the controllers 180, 190 the GUI 195, and any of the sensors, includes the node 1000 and/or components thereof, and/or one or more nodes that are substantially similar to the node 1000 and/or components thereof.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, a database may be any standard or proprietary database software, such as Oracle, Microsoft Access, SyBase, or DBase II, for example. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, while different steps, processes, and procedures are described as appearing as distinct acts, one or more of the steps, one or more of the processes, and/or one or more of the procedures could also be performed in different orders, simultaneously and/or sequentially. In several example embodiments, the steps, processes and/or procedures could be merged into one or more steps, processes and/or procedures.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," "front-to-back," etc., are for the purpose of illustration only and do not limit the specific orientation or location of the structure described above.

In several example embodiments, one or more of the operational steps in each embodiment may be omitted or rearranged. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of managing a drilling anomaly, the method comprising:
    providing a computing device comprising a graphical user interface ("GUI") that is configured to display a plurality of screens to a user in response to detection of the drilling anomaly,
    displaying a first screen in the plurality of screens, wherein the first screen includes a menu listing proposed actions to address the detected drilling anomaly and an estimated success rate associated with each of the proposed actions;
    wherein each of the proposed actions is selectable by the user via the GUI;
    receiving, by the computing device and via the GUI, a first selection command associated with a first proposed action from the proposed actions;
    displaying a second screen in the plurality of screens, wherein the second screen includes a first illustration depicting execution of the first proposed action that was selected by the user via the first selection command; and
    receiving, by the computing device and via the GUI, a command to execute one of the proposed actions.

2. The method of claim 1, further comprising:
    receiving, by the computing device, a second selection command associated with a second proposed action that is different from the first proposed action; and
    displaying a third screen in the plurality of screens, wherein the third screen includes a second illustration depicting execution of the second proposed action that was selected by the user via the second selection command; and
    wherein the second illustration is different from the first illustration.

3. The method of claim 1,
    wherein the detected drilling anomaly is associated with a drilling operation of a wellbore; and
    wherein the first illustration is at least one of: an illustration of a bottom-hole-assembly ("BHA") relative to a wellbore through which the BHA extends; an illustration of the BHA relative to other wellbores through which the BHA does not extend; an illustration of a bit that forms a portion of the BHA relative to the wellbore; an illustration of the BHA moving relative to the wellbore through which the BHA extends; or an illustration of a tool associated with the drilling anomaly.

4. The method of claim 1, further displaying a fourth screen in the plurality of screens, wherein the fourth screen explains the estimated success rate associated with the first proposed action that was selected by the user via the first selection command.

5. The method of claim 1, wherein one of the proposed actions listed in the menu is a proposed action that the user has executed in response to historical drilling anomalies that are at least substantially the same as the detected drilling anomaly.

6. The method of claim 1, wherein the drilling anomaly is at least one of: a stick-slip event; a predicted stick-slip event; a data entry error by the user; a kick detection; a predicted kick event; a high inflow detection; a predicted high inflow event; a deviation from a well plan; or a predicted deviation from the well plan.

7. The method of claim 1, further comprising displaying a fifth screen in the plurality of screens, wherein the fifth screen includes one or more graphs detailing data received from a plurality of sensors; and
    wherein in response to the detection of the drilling anomaly, the fifth screen identifies the drilling anomaly and identifies portion(s) of the one or more graphs associated with the drilling anomaly.

8. The method of claim 1, further comprising:
    displaying a fifth screen in the plurality of screens, wherein the fifth screen includes one or more graphs detailing data received from a plurality of sensors;
        wherein the fifth screen further includes a selectable visual alert in response to the detection of the drilling anomaly; and
    receiving, by the computing device and via the GUI, a selection command associated with the selectable visual alert; and
    wherein displaying the first screen is in response to receipt of the selection command associated with the selectable visual alert.

9. The method of claim 1, further comprising executing, using the computing device, one of the proposed actions in response to the receipt of the command to execute one of the proposed actions.

10. The method of claim 1, wherein the estimated success rate that is associated with each of the proposed actions is based on historical data.

11. A computing device comprising a graphical user interface ("GUI") configured to display a plurality of screens to a user in response to detection of a drilling anomaly,
- wherein a first screen in the plurality of screens includes a menu listing proposed actions to address the drilling anomaly and an estimated success rate associated with each of the proposed actions;
  - wherein each of the proposed actions is selectable by the user via the GUI;
- wherein the computing device is configured to receive a first selection command associated with a first proposed action from the proposed actions,
- wherein a second screen in the plurality of screens includes a first illustration depicting execution of the first proposed action that was selected by the user via the first selection command; and
- wherein the computing device is configured to receive, via the GUI, a command to execute one of the proposed actions.

12. The computing device of claim 11,
- wherein the computing device is configured to receive a second selection command associated with a second proposed action that is different from the first proposed action;
- wherein a third screen in the plurality of screens includes a second illustration depicting execution of the second proposed action that was selected by the user via the second selection command; and
- wherein the second illustration is different from the first illustration.

13. The computing device of claim 11,
- wherein the drilling anomaly is associated with a drilling operation of a wellbore; and
- wherein the first illustration is at least one of: an illustration of a bottom-hole-assembly ("BHA") relative to a wellbore through which the BHA extends; an illustration of the BHA relative to other wellbores through which the BHA does not extend; an illustration of a bit that forms a portion of the BHA relative to the wellbore; an illustration of the BHA moving relative to the wellbore through which the BHA extends; or an illustration of a tool associated with the drilling anomaly.

14. The computing device of claim 11, wherein a fourth screen in the plurality of screens explains the estimated success rate associated with the first proposed action that was selected by the user via the first selection command.

15. The computing device of claim 11, wherein one of the proposed actions listed in the menu is a proposed action that the user has executed in response to historical drilling anomalies that are at least substantially the same as the detected drilling anomaly.

16. The computing device of claim 11, wherein the drilling anomaly is at least one of: a stick-slip event; a predicted stick-slip event; a data entry error by the user; a kick detection; a predicted kick event; a high inflow detection; a predicted high inflow event; a deviation from a well plan; or a predicted deviation from the well plan.

17. The computing device of claim 11,
- wherein a fifth screen in the plurality of screens includes one or more graphs detailing data received from a plurality of sensors; and
- wherein in response to the detection of the drilling anomaly, the fifth screen identifies the drilling anomaly and identifies portion(s) of the one or more graphs associated with the drilling anomaly.

18. The computing device of claim 11,
- wherein a fifth screen in the plurality of screens includes one or more graphs detailing data received from a plurality of sensors;
- wherein the fifth screen further displays a selectable visual alert in response to the detection of the drilling anomaly;
- wherein the computing device is configured to receive a selection command associated with the selectable visual alert; and
- wherein the computing device is configured to display the first screen in response to receipt of the selection command associated with the selectable visual alert.

19. The computing device of claim 11, wherein the computing device is configured to execute one of the proposed actions in response to the receipt of the command to execute one of the proposed actions.

20. The computing device of claim 11, wherein the estimated success rate that is associated with each of the proposed actions is based on historical data.

* * * * *